United States Patent [19]
Soltis et al.

[11] 4,418,130
[45] Nov. 29, 1983

[54] ADDITIVE FOR ZINC ELECTRODES

[75] Inventors: Daniel G. Soltis, Broadview Heights; Dean W. Sheibley, Sandusky; William J. Nagle, Sheffield Lake, all of Ohio

[73] Assignee: The United States of America as represented by the Administrator of the National Aeronautics and Space Administration, Washington, D.C.

[21] Appl. No.: 272,406

[22] Filed: Jun. 10, 1981

[51] Int. Cl.³ .................. H01M 6/04; H01M 4/42
[52] U.S. Cl. .................. 429/206; 429/229; 252/182.1
[58] Field of Search .......... 429/206, 229, 230, 232, 429/231, 248, 223, 219; 252/182.1, 521; 423/635

[56] References Cited

U.S. PATENT DOCUMENTS

| | | | |
|---|---|---|---|
| 3,639,176 | 2/1972 | Nordbloom et al. | 429/206 |
| 3,970,477 | 7/1976 | Ciliberti | 429/206 |
| 3,976,502 | 8/1976 | Sekido et al. | 429/206 |
| 4,039,729 | 8/1977 | Benczur-Urmossy | 429/206 |
| 4,124,743 | 11/1978 | Chireau et al. | 429/248 |
| 4,279,978 | 7/1981 | Dodin et al. | 429/248 |
| 4,312,931 | 1/1982 | Witherspoon et al. | 429/231 |

OTHER PUBLICATIONS

Hackh's Chemical Dictionary: Grant, Julius, Ed.; 1972, New York, St. Louis, San Francisco, etc: McGraw-Hill Book Company, p. 78

Primary Examiner—Brian E. Hearn
Assistant Examiner—Stephen J. Kalafut
Attorney, Agent, or Firm—Norman T. Musial; John R. Manning; James A. Mackin

[57] ABSTRACT

An improved zinc electrode for alkaline cells includes up to about ten percent by weight of $Ba(OH)_2.8H_2O$ with about five percent being preferred. The zinc electrode may or may not be amalgamated with mercury.

4 Claims, No Drawings

ADDITIVE FOR ZINC ELECTRODES

ORIGIN OF THE INVENTION

This invention was made by employees of the U.S. Government and may be manufactured or used by or for the Government without the payment of any royalties thereon or therefor.

TECHNICAL FIELD

This invention relates to secondary cells and is directed more particularly to alkaline electrolyte cells having at least one zinc electrode.

Because of pollution problems resulting from the various chemicals emitted by internal combustion automobile and truck engines together with several criseses in the abvailability of crude oil in recent years, there has been greatly increased interest in electric automobiles. Because electric automobiles are powered by batteries of electromotive force (EMF) cells, there has been a parallel increase in research and development work on the various aspects of EMF cells.

Lead-acid batteries have been used in the past for powering electric automobiles and are currently in use for various dollies and vehicles used, for example, to move stock in factories. The high weight and expense which result from providing a sufficient number of lead-acid batteries to achieve a practical range of operation for an electric automobile is presently too great to make such vehicles acceptable to the general public.

A desirable alternative to the lead-acid battery is the nickel-zinc alkaline battery. There are, however, a number of problems with zinc electrodes. Among these problems are slumping of the electrode, the formation of dendrites which eventually short out the separators between the electrodes, densification, material loss, and drying out. These deficiencies result in loss of capacity, shorting of the separators, inability to sustain a required current output, and limitation of cycling capability.

Some of the foregoing problems have been ameliorated by improved separators which reduce dendrite formation and minimize slumping of the zinc electrode. Even with improved separators, nickel zinc cells were still handicapped by loss of capacity, increased cell operating temperatures and densification of the zinc electrodes after relatively short periods of operation.

BACKGROUND ART

U.S. Pat. No. 2,902,530 to Eisen and U.S. Pat. No. 3,060,254 to Urry both disclose the use of carboxymethylcellulose as a binder or adhesive for anode or cathode materials covering the surface of a fibrous electrode.

U.S. Pat. No. 2,448,052 to Roberts discloses the use of cellulose materials as expanders for cadmium electrodes, the cellulose material swelling when contacted by an alkaline electrolyte.

U.S. Pat. Nos. 2,519,399 to Roberts, 2,727,080 to Moulton, and 2,870,234 to Moulton all disclose expander materials to be contained in electrodes and including polyvinylalcohol, rubber and polyvinylpyrrolidone.

U.S. Pat. No. 3,053,924 to Strauss discloses an electrode for an alkaline cell wherein cellulosic material is deposited within the pores of the electrode itself to limit dendrite formation or treeing.

U.S. Pat. No. 3,184,340 to Andre teaches that crystalline lithium hydroxide may be precipitated from a lithium hydroxide solution contained in pores of a nickel or silver electrode to be used in an alkaline-nickel or alkaline-silver accumulator.

DISCLOSURE OF THE INVENTION

In accordance with the present invention, up to about 10% by weight of $Ba(OH)_2.8H_2O$ powder is mixed with zinc powder and formed into an electrode for an alkaline cell as, for example, by pressing the mixture into a suitable electrode configuration. A suitable binder may also be added to the powdered mixture before the forming step.

BEST MODE FOR CARRYING OUT THE INVENTION

According to the invention, zinc powder and $Ba(OH)_2.8H_2O$ powder are mixed together, the $Ba(OH)_2.8H_2O$ comprising up to about 10% but preferably 5% by weight of the total mixture. The mixture is then formed into a desired shaped electrode by any of the pressing techniques which are well-known in the prior art of electrode forming.

A number of zinc electrodes embodying the invention were installed in alkaline cells and tested against cells having zinc electrodes with no additives and against other cells in which carboxymethylcellulose was incorporated into the electrodes. The results of these tests are shown in Table I below.

The test conditions for the results indicated in Table I were: 6 hours (25 amperes) charge; 2 hours (75 amperes) discharge; and, 50% depth of discharge, 150 ampere hours, cycling continuously. Three types of cells were tested, the type 1 cells having no additives in the zinc electrodes, the type 2 cells including 5% by weight of carboxymethylcellulose, and the type 3 cells includng approximately 5% by weight of the barium hydroxide octohydrate. None of the cells tested included mercury in the zinc electrodes. However, the zinc electrodes embodying the invention can be amalgamated without any problem as is known in the prior art, since mercury will not react with $Ba(OH)_2.8H_2O$.

To increase the accuracy of the results shown in Table I, three cells of each type were constructed and tested. One of the type 1 cells failed before completion of 63 cycles. Further, two of the type 2 cells failed before completing 63 cycles of testing. One of the type 3 cells failed at 163 cycles. The average for the three type 3 cells, including the cell that failed, was 212 cycles.

TABLE I

| Exp. | Cycles | °C. Temp. Range | AHI | AHD |
| --- | --- | --- | --- | --- |
| Type 1 | 8 | 26–28 | 147.7 | 145.7 |
| Type 2 | 8 | 27–29 | 147.3 | 145.7 |
| Type 3 | 8 | 24–25 | 149.3 | 146.4 |
| Type 1 | 63 | 27–30 | 143 | 144 |
| Type 2 | 63 | 27–30 | 137.9 | 128.5 |
| Type 3 | 63 | 24–25 | 150 | 147.8 |
| Type 1 | 141 | 30–34 | 146 | 117.0 |
| Type 2 | 141 | 31–36 | 132 | 42.0 |
| Type 3 | 141 | 26–27 | 148 | 145 |
| Type 3 | 212 | 28–29.5 | 148 | 121 |

From Table I, it will be seen that an alkaline cell utilizing a zinc electrode incorporating $Ba(OH)_2.8H_2O$ in accordance with the present invention has a greatly extended life. This makes silver zinc or nickel zinc cells much more acceptable in terms of useful life when compared to lead-acid batteries presently in general use.

It will be understood that changes and modifications may be made to the above-described invention by those skilled in the art without departing from the spirit and scope of the invention as set forth in the claims appended hereto.

We claim:

1. A zinc electrode for a cell having KOH or NaOH electrolyte, said electrode containing from about 5% to about 10% by weight of $Ba(OH)_2 \cdot 8H_2O$.

2. The electrode of claim 1 wherein $Ba(OH)_2 \cdot 8H_2O$ is contained in the amount of approximately 7% by weight.

3. An alkaline cell having a positive electrode of a metal selected from the group consisting of silver and nickel and a negative zinc electrode containing from about 5% up to about 10% by weight of $Ba(OH)_2 \cdot 8H_2O$.

4. The cell of claim 3 wherein said zinc electrode contains about 7% by weight of $Ba(OH)_2 \cdot 8H_2O$.

* * * * *